(12) United States Patent
Brondijk

(10) Patent No.: US 8,036,077 B2
(45) Date of Patent: Oct. 11, 2011

(54) METHOD AND RECORDING APPARATUS FOR RECORDING INFORMATION ON A MULTI-LAYER DISC

(75) Inventor: Robert Albertus Brondijk, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 941 days.

(21) Appl. No.: 10/575,421

(22) PCT Filed: Oct. 12, 2004

(86) PCT No.: PCT/IB2004/052058
§ 371 (c)(1),
(2), (4) Date: Apr. 10, 2006

(87) PCT Pub. No.: WO2005/036537
PCT Pub. Date: Apr. 21, 2005

(65) Prior Publication Data
US 2007/0053244 A1     Mar. 8, 2007

(30) Foreign Application Priority Data
Oct. 13, 2003   (EP) .................................... 03103778

(51) Int. Cl.
*G11B 7/004*    (2006.01)

(52) U.S. Cl. .................................. 369/47.55; 369/94
(58) Field of Classification Search ................ None
See application file for complete search history.

(56) References Cited

U.S. PATENT DOCUMENTS

| | | | |
|---|---|---|---|
| 6,678,236 B1* | 1/2004 | Ueki | 369/275.3 |
| 7,082,092 B2* | 7/2006 | Weijenbergh et al. | 369/59.25 |
| 7,158,466 B2* | 1/2007 | Tanaka | 369/94 |
| 7,184,377 B2* | 2/2007 | Ito et al. | 369/47.14 |
| 2003/0002420 A1* | 1/2003 | Yoon et al. | 369/59.25 |
| 2003/0081535 A1 | 5/2003 | Ross | |
| 2003/0103431 A1* | 6/2003 | Kuroda | 369/59.25 |
| 2005/0013216 A1* | 1/2005 | Kim et al. | 369/47.5 |

FOREIGN PATENT DOCUMENTS

| | | |
|---|---|---|
| CN | 1344407 A | 4/2002 |
| EP | 1187110 A1 | 3/2000 |
| EP | 0712130 A1 | 5/2006 |

* cited by examiner

*Primary Examiner* — Wayne Young
*Assistant Examiner* — Brian Butcher

(57) ABSTRACT

A method and apparatus for recording information on a multi-layer record carrier includes recording control information in a control information zone before recording user information after a layer jump. This ensures that all user information can be read and recorded reliably, while the storage capacity of the record carrier for storing user information is not reduced.

11 Claims, 3 Drawing Sheets

METHOD AND RECORDING APPARATUS FOR RECORDING INFORMATION ON A MULTI-LAYER DISC

Figure 1:
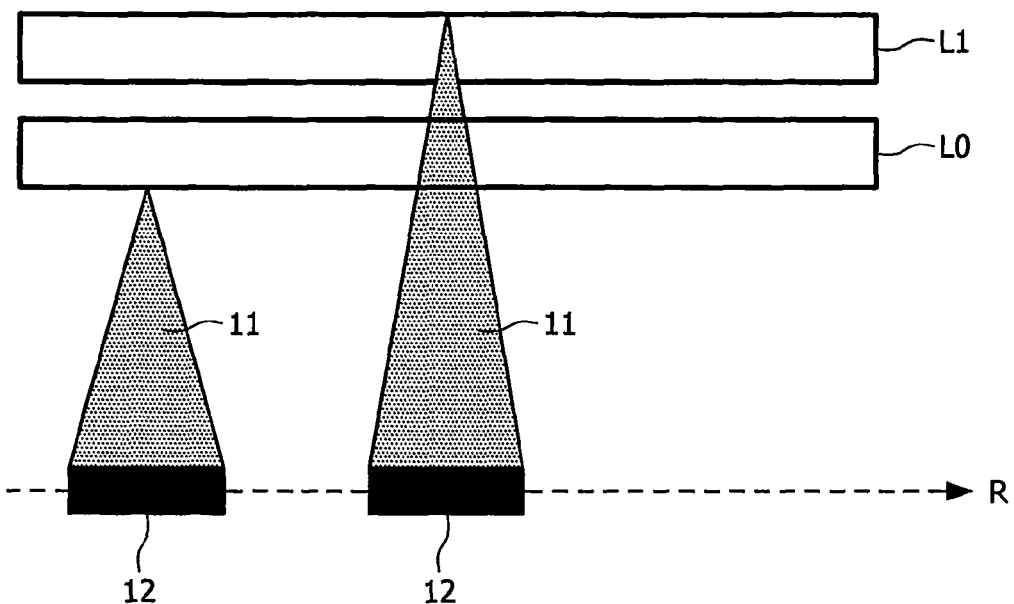

The invention relates in general to a method of recording information on a multi-layer optical record carrier, said record carrier comprising at least two information layers and each of said information layers comprising an inner control information area, an user information area, and an outer control information area, the method comprising a first recording step of writing information patterns representing user information in the user information area of a first of said at least two information layers, a subsequent second recording step of writing information patterns representing user information in the user information area of a second of said at least two information layers, and a subsequent finalization step of writing information patterns representing control information in the inner control information areas and the outer control information areas of said first and second information layers.

The invention further relates to a recording apparatus for recording information on a multi-layer optical record carrier, said record carrier comprising at least two information layers and each of said information layers comprising an inner control information area, an user information area, and an outer control information area, the recording apparatus comprising writing means for writing information patterns representing information in the information layers, positioning means for controlling the writing means such as to write information patterns on either a first or a second of said at least two information layers, and control means for controlling the writing means and the positioning means such as to write information patterns representing user information in the user information area of the first of said at least two information layers, to subsequently write information patterns representing user information in the user information area of the second of said at least two information layers, and to subsequently write information patterns representing control information in the inner control information areas and the outer control information areas of said first and second information layers. More specifically, the invention relates to a method and to a recording device for recording information on a dual-layer recordable DVD (Digital Versatile Disc) type disc.

Prerecorded dual-layer DVD-ROM discs are well known. Such a disc comprises two information layers that are separated by a thin space layer. A first information layer (generally referred to as layer L0) is partially transparent, allowing a second layer (generally referred to as layer L1) to be read out through the first layer. The thickness of the space layer is bigger than the focal depth of the imaging optics, thereby allowing both information layers to be read out by a radiation beam entering the disc from the same side. The individual information layers can be accessed by focusing the radiation beam onto each individual information layer (for example by means of a focus actuator). Known dual-layer DVD ROM-disc have a storage capacity of 8.5 Gbytes.

To be able to record large amount of information (such as for example for recording video information) a recordable DVD type disc (DVD+R capable of storing 4.7 Gbytes) was introduced. Such a recordable disc comprises a recordable information layer in which information in the form of information patterns can be recorded by irradiating it with a radiation beam. By modulating the radiation beam in accordance with the information to be recorded optically detectable marks, forming the information patterns, are formed in the information layer. The surface of the information layer capable of recording information is in general divided into three parts: an inner control information area (also referred to as Lead-in Area), a user information area (also referred to as Data Area), and an outer control information area (also referred to as Lead-out Area).

Recently dual-layer Recordable DVD type discs were introduced capable of storing 8.5 Gbytes of information. These discs allow for storing the same amount of information as a dual-layer DVD ROM-disc. Such a dual-layer recordable disc comprises two recordable information layers. Information can be recorded on each individual layer by focusing the radiation beam on the information layer and modulating the radiation beam in accordance with the information to be recorded. When recording large amount of information (such as for example video) the information is recorded in one continuous sequence starting from the first Logical Block Address up to the last Logical Block Address. However, this Logical Addressing Space is in general physically divided over the at least two information layers; the first Logical Block Address physically located in the user information area of the first information layer (layer L0) and the last Logical Block Address located in the user information area of the second information layer (layer L1). Therefore, the focusing of the radiation beam has to be changed from the first information layer to the second information layer during the recording of the information. This so-called layer jump is also required when reading the recorded information.

To be able to reliably read a block of information patterns from an area on an specific information layers, it is required that said block is preceded by an area on the same information layer also comprising information patterns. This preceding area is necessary for allowing the system optics and electronics to settle. To ensure that all information recorded in the user information areas on the various layers can be reliably read, a finalization step is performed after recording all of the user information in the user information areas. In this finalization step information patterns representing control information are written in the inner control information areas and the outer control information areas of at least said first and second information layers such that all areas in the user information area is preceded by an area comprising information. In general most of the control information areas will be filled with dummy data, such as for example all zeros. However, generally also some part of the control information areas (especially the Lead-in Area) is filled with control information identifying the disc (such as physical format information and disc manufacturing information).

It is, however, a problem that not all user information can be read before a disc is finalized. It is especially a problem that during recording of user information, the user information recorded directly after a layer jump cannot be read back reliably.

It is an object of the present invention to provide a method of recording information on a multi-layer optical record carrier that allows the user information recorded directly after a layer jump to be read back reliably without the need for finalizing the record carrier.

This object is achieved according to the invention when the method of the preamble is characterized in that it further comprises an initialization step of writing information patterns representing control information in at least one of the inner control information area and the outer control area of the second information layer, and in that the initialization step is located in time before the second recording step.

According to the invention control information, such as for example a block of dummy data consisting of all zeros, is recorded in a control information area adjoining the area of the user information area where user information is to be recorded after a layer jump. In this way an area comprising information patterns always precedes the area comprising the user information recorded after a layer jump. Moreover, it is an additional advantage that according to the invention the control information is recorded in a control information area thereby not recording any dummy data in the user information area, which would reduce the effective storage capacity of the record carrier for storing user information.

In general two recording principles may be used when recording a multi-layer disc; 1) Parallel Track Path (PTP) where each information layer is recorded in the same direction (for example, each layer is recorded from the inner diameter of the disc towards the outer diameter), or 2) Opposite Track Path (OTP) where an information layer is recorded in a direction opposite to its neighboring information layers. According to an embodiment of the method according to the invention the information patterns representing control information are written in the outer control information area of the second information layer of an OTP-type record carrier. In such an OTP-type record carrier the outer control information area is often referred to as the Middle Zone. Now, the layer jump is relatively fast since no radial displacement of the radiation beam is required. Only the focusing of the radiation beam has to be changed from the first information layer to the second information layer.

In an embodiment of the method according to the invention the initialization step is located in time before the first recording step. Although the initialization step may be performed at any time before writing a first block of user information in the user information area of the second information layer, it is advantageous when the initialization step of writing information patterns representing control information in at least one of the control areas of the second information layer is performed before any user information is recorded at all. This because now the user information can be continuously written onto the information layers of the record carrier, the writing process only being interrupted by the layer jump itself and not by the initialization step of writing control information. This is especially advantageous when the user information to be recorded is a continuous and uninterrupted stream of, for example, video data.

According to an embodiment of the method according to the invention, a minimal amount of control information, such as for example dummy data consisting of all zeros, is written in the initialization step. In this way the initialization step requires the least amount of time. In general this minimal amount corresponds to one ECC (Error Correction Coded) block of control information. In a DVD type disc one ECC block holds 208 rows of 182 bytes. The way an ECC block is formed is described in more detail in, for example, section 133 of the DVD+R standard "DVD+R 4.7 Gbytes, Basic Format Specification, version 1.11".

It is a further object of the present invention to provide a recording apparatus using the method according to the invention.

This object is achieved when the recording apparatus of the preamble is characterized in that the control means are adapted for writing information patterns representing control information in at least one of the inner control information area and the outer control area of the second information layer before the writing information patterns representing user information in the user information area of the second of said at least two information layers.

Figure 2:
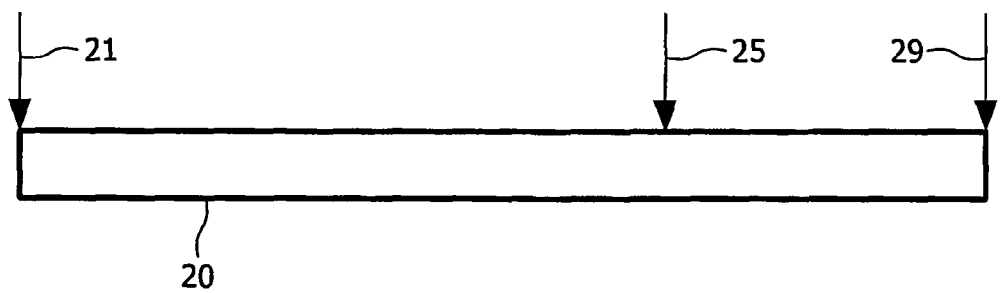
Figure 3A:
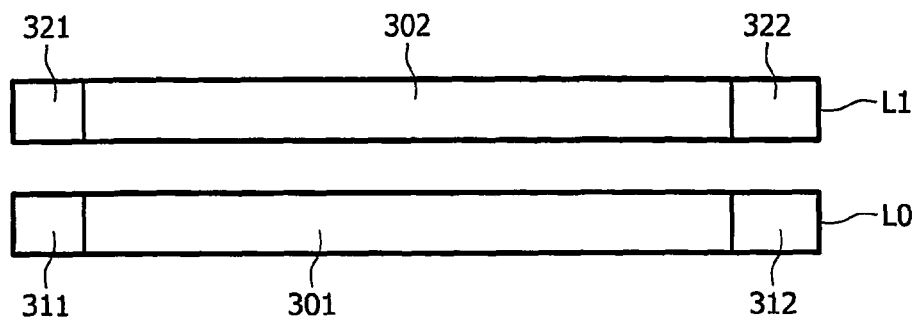
Figure 3B:
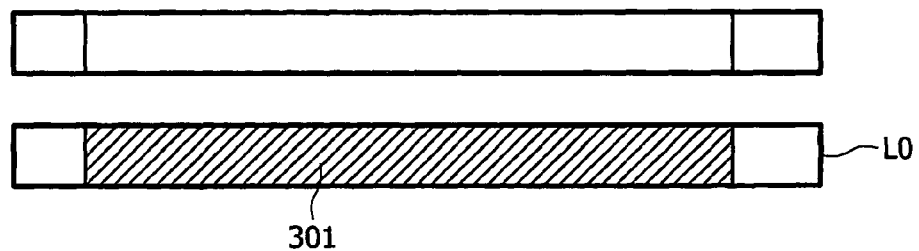
Figure 3C:
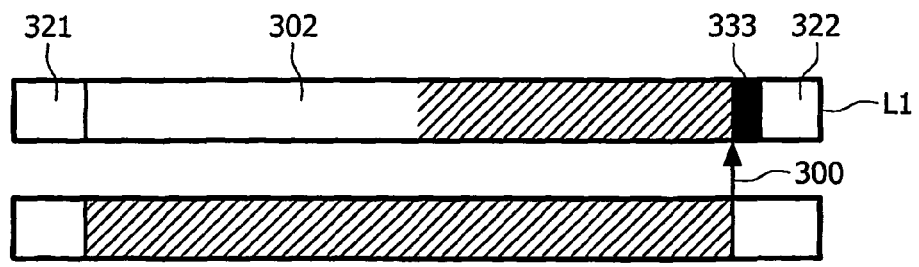
Figure 3D:
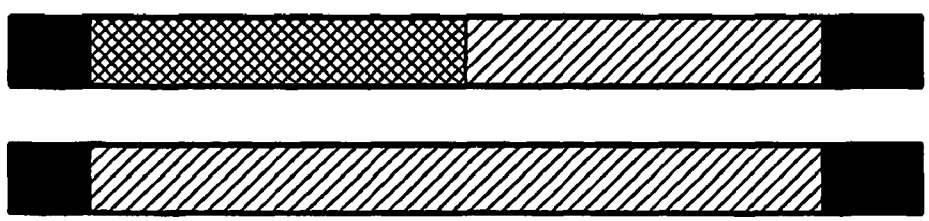
Figure 4:
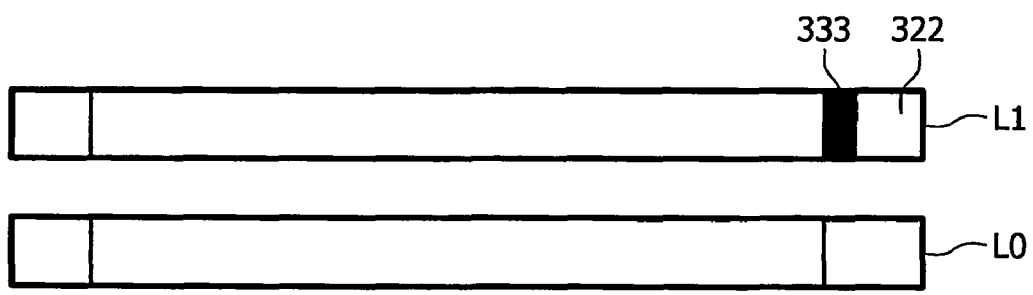

These and other objects, features and advantages of the invention will be apparent from the following more particular descriptions of embodiments of the invention as illustrated in the accompanying drawings, where FIG. 1 shows a schematic representation of two information layers of a multi-layer record carrier being irradiated by a focused radiation beam, FIG. 2 shows the logical addressing space of a dual layer record carrier, FIG. 3 shows steps of a method of recording information on a multi-layer record carrier according to a first embodiment of the invention, and FIG. 4 shows a step of a method of recording information on a multi-layer record carrier according to a second embodiment of the invention.

FIG. 1 shows a first information layer, L0, and a second information layer, L1, of a multi-layer record carrier. The information layers are irradiated by a radiation beam 11 entering the record carrier from the side of the record carrier located closer to layer L0 than to layer L1. The radiation beam is controlled by positioning means 12 which allow the radiation beam to be focused on either the first information layer, L0, or the second information layer, L1, (for example by means of a focus actuator), and which allow the radiation beam to be moved in a radial direction, R, parallel to the information layers thereby positioning the focal point of the radiation beam on a specific area to be recorded. The positioning means 12 are controlled by control means (not shown). These control means also control the modulation of the radiation beam thereby forming either a mark or a space region in the area being recorded.

FIG. 2 schematically represent the Logical Addressing Space 20 of a dual layer record carrier, such as for example a dual layer DVD disc. The first Logical Block Address 21 is located at the beginning of the Logical Addressing Space and the last Logical Block Address 29 is located at end of the Logical Addressing Space. According to the invention, user information recorded in the user information areas 301, 302 of the two information layers is accessible through one contiguous range of Logical Block Addresses. Although the Block Addresses are physically distributed over the two information layers L0 and L1, this is transparent to a recording system since no control information is present in the Logical Addressing Space 20 directly after the Logical Block Address 25 where the layer jump occurred (that is, Logical Block Address 25 is located physically on the second information layer L1, while the previous Logical Block Address is located physically on the first information layer L0).

FIG. 3 shows the steps of a first embodiment of the method according to the invention. FIG. 3A shows two information layers, L0 and L1, of an unrecorded record carrier. Each of the information layers comprises an inner control information area 311, 321 located at the inner diameter of the disc, a user information area 301, 302 for recording the user information, and an outer control information area 312, 322 located at the outer diameter of the disc. The outer control information areas are often referred to as the Middle Zone. On a dual layer disc the inner control information zone 311 on the first information layer is often referred to as the Lead-in Area, while the inner control information zone 321 on the second information layer is often referred to as the Lead-out Area. The user information areas 301, 302 are often referred to as the Data Area.

FIG. 3B shows the record carrier after writing information patterns representing user information in the user information area 301 of the first information layer L0. This recorded user information corresponds to the Logical Addressing Space 20 ranging from the first Logical Block Address 21 to the Logical Block Address just before the Logical Block Address 25 where a layer jump would occur. FIG. 3C shows the record carrier after a layer jump 300 and writing information patterns representing user information in the user information area 302 of the second information layer L1. The user information recorded in layer L1 corresponds to the Logical Addressing Space 20 ranging from the Logical Block Address 25 where the layer jump occurred to the last Logical Block Address 29. It is noted that the user information area 302 of the second information layer L1 is by way of example only partly recorded with user information. However, this user information area 302 of the second information layer may be recorded with any amount of user information.

To be able to reliably access all of the user information recorded in the second information layer L1, especially the user information recorded in the user information layer 302 directly after the layer jump 300, an amount of control information patterns 333 representing all zeros is recorded in the outer control area 322 (or Middle Zone) of the second information layer L1 directly adjacent to the user information area 302. It is noted that dummy data representing values other than all zeros may alternatively be recorded. Preferably the amount of control information patterns 333 corresponds to one ECC block of control information. This is the minimum amount of control information that should be recorded in the outer control area 322 for allowing the adjacent block of user information in the user information area 302 to be read reliably.

It is noted that the control information patterns 333 are recorded in the outer control information area 322 when an OTP type dual layer disc is used. However, when a PTP type disc is used the first block of user information after a layer jump is recorded in the user information area adjacent to the inner control information area 321 on the second information layer L1. Therefore the control information patterns 333 should be recorded in the inner control information area 321 adjacent to the block of user information recorded directly after the layer jump.

After all user information has been written onto the record carrier, the record carrier is finalized. In this finalization step all control areas and, when applicable, the part of the user information area not recorded with user information is recorded with control information, as is shown in FIG. 3D.

FIG. 3 illustrates an embodiment of the method according to the invention in which the initialization step of writing control information patterns 333 is performed after the first recording step of writing user information to the first information layer L0 and before the second recording step of writing user information to the second information layer L1. An alternative embodiment is illustrated in FIG. 4. Here the initialization step of writing control information patterns 333 is performed before the first recording step of writing user information to the first information layer L0 and before the second recording step of writing user information to the second information layer (that is, the record carrier is initialized before any user information is recorded). This allows for a more smooth transition from recording user information on the first information layer to recording user information on the second information layer, since no control information patterns 333 need to be recorded directly after the layer jump thereby interrupting the user information recoding process.

The invention claimed is:

1. A method of recording information on a multi-layer optical record carrier, said record carrier comprising at least two information layers and each of said at least two information layers comprising an inner control information area, a user information area, and an outer control information area, the method comprising the acts of:

a first recording act of writing information patterns representing user information in the user information area of a first layer of said at least two information layers;

a subsequent second recording act of writing information patterns representing user information in the user information area of a second layer of said at least two information layers;

a subsequent finalization act of writing information patterns representing control information in the inner control information areas and the outer control information areas of said first layer and said second layer; and an initialization act of writing information patterns representing control information in at least one of the inner control information area and the outer control area of the second layer, wherein the initialization act is located in time after the first recording act and before the second recording act for allowing the user information recorded on the second layer directly after a layer jump from the first layer to the second layer to be read back before the finalizing act.

2. The method according to claim 1, wherein the initialization act of writing information patterns representing control information is performed in the outer control information area of the second information layer.

3. The method according to claim 1, wherein an amount of information patterns representing control information written in the initialization act corresponds to one ECC block of information.

4. A recording apparatus for recording information on a multi-layer optical record carrier, said record carrier comprising at least two information layers and each of said at least two information layers comprising an inner control information area, a user information area, and an outer control information area, the recording apparatus comprising:

a writing device for writing information patterns representing information in the at least two information layers;

a positioning device for controlling the writing device such as to write information patterns on either a first layer or a second layer of said at least two information layers; and a controller for controlling the writing device and the positioning device such as to write information patterns representing user information in the user information area of the first layer;

to subsequently write information patterns representing user information in the user information area of the second layer;

to subsequently write information patterns representing control information in the inner control information areas and the outer control information areas of said first layer and second layer; and to finalize writing information patterns representing control information in the inner control information areas and the outer control information areas of the first layer and the second layer, wherein the controller is adapted for writing information patterns representing control information in at least one of the inner control information area and the outer control area of the second layer after writing information patterns representing user information in the user information area of the first layer and before writing information patterns representing user information in the user information area of the second layer for allowing the user information recorded on the second layer directly after a layer jump from the first layer to the second layer to be read back before finalizing the writing information patterns representing the control information.

5. The recording apparatus of claim 4, wherein an amount of information patterns representing control information written in the at least one of the inner control information area and the outer control area of the second layer corresponds to one ECC block of information.

6. A method of recording information on a multi-layer optical record carrier comprising the acts of:
writing user information in a user information area of a first information layer;
after the writing user information act and before a jump to a second information layer for writing further user information in the second information layer, writing control information in a control area of the second information layer;
after the writing control information act, writing the further user information in a user information area of the second information layer;
and
after the act of writing further user information, finalizing the writing of the control information in the inner control information areas and the outer control information areas of the first information layer and the second information layer.

7. The method of claim 6, wherein the control area is directly adjacent to the user information area of the second information layer.

8. The method of claim 6, wherein an amount of information patterns representing control information written in the inner control area and the outter control area of the second layer corresponds to one ECC block of information.

9. An apparatus for recording information on a multi-layer optical record carrier comprising a controller configured to:
write user information in a user information area of a first information layer;
after writing the user information and before a jump to a second information layer for writing further user information in the second information layer, write control information in a control area of the second information layer;
after writing the control information, write the further user information in a user information area of the second information layer;
and
after writing the further user information, finalize the writing of the control information in the inner control information areas and the outer control information areas of the first information layer and the information second layer.

10. The apparatus of claim 9, wherein the control area is directly adjacent to the user information area of the second information layer.

11. The apparatus of claim 9, wherein an amount of information patterns representing control information written in the inner control area and the outter control area of the second layer corresponds to one ECC block of information.

\* \* \* \* \*